(12) United States Patent
Hwang et al.

(10) Patent No.: US 7,027,822 B1
(45) Date of Patent: Apr. 11, 2006

(54) DISTRIBUTED GPS FOR GEOLOCATION OF A NETWORK OF NODES

(75) Inventors: Patrick Y. Hwang, Marion, IA (US);
Scott J. F. Zogg, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 583 days.

(21) Appl. No.: 10/254,895

(22) Filed: Sep. 25, 2002

(51) Int. Cl.
*H04Q 7/20* (2006.01)

(52) U.S. Cl. ............................... 455/456.1; 456/404.2; 456/456.5; 456/456.6; 456/524; 456/517; 456/457

(58) Field of Classification Search ............. 455/456.1, 455/456.5, 456.6, 404.2, 427, 12.1, 524, 455/517, 457, 67.15
See application file for complete search history.

(56) References Cited

U.S. PATENT DOCUMENTS

| | | | |
|---|---|---|---|
| 5,952,959 A * | 9/1999 | Norris ................... 342/357.08 |
| 6,285,316 B1 * | 9/2001 | Nir et al. ................ 342/357.09 |
| 6,603,976 B1 * | 8/2003 | Amirijoo et al. ......... 342/357.1 |
| 6,744,740 B1 * | 6/2004 | Chen .......................... 370/255 |
| 6,816,460 B1 * | 11/2004 | Ahmed et al. .............. 370/238 |
| 6,845,239 B1 * | 1/2005 | Sato et al. ................ 455/456.1 |
| 2001/0045905 A1 * | 11/2001 | Syrjarinne et al. ...... 342/357.08 |
| 2002/0094823 A1 * | 7/2002 | Suzuki et al. ............... 455/456 |
| 2002/0186165 A1 * | 12/2002 | Eschenbach ........... 342/357.15 |
| 2003/0032436 A1 * | 2/2003 | Mikuni ....................... 455/457 |
| 2004/0034471 A1 * | 2/2004 | Rorabaugh .................. 701/214 |
| 2004/0203380 A1 * | 10/2004 | Hamdi et al. .............. 455/41.2 |

* cited by examiner

*Primary Examiner*—Sonny Trinh
*Assistant Examiner*—Huy Phan
(74) *Attorney, Agent, or Firm*—Nathan D. Jensen; Kyle Eppele

(57) ABSTRACT

A method of determining absolute positions of devices in a network. Relative distances between the devices are determined. For each of at least one of the devices, a range is calculated from a number of distant ranging sources that is less than an amount required to obtain a precise location of the device. The calculated ranges are combined with the determined relative distances to determine a unique absolute position of the devices in the network.

20 Claims, 4 Drawing Sheets

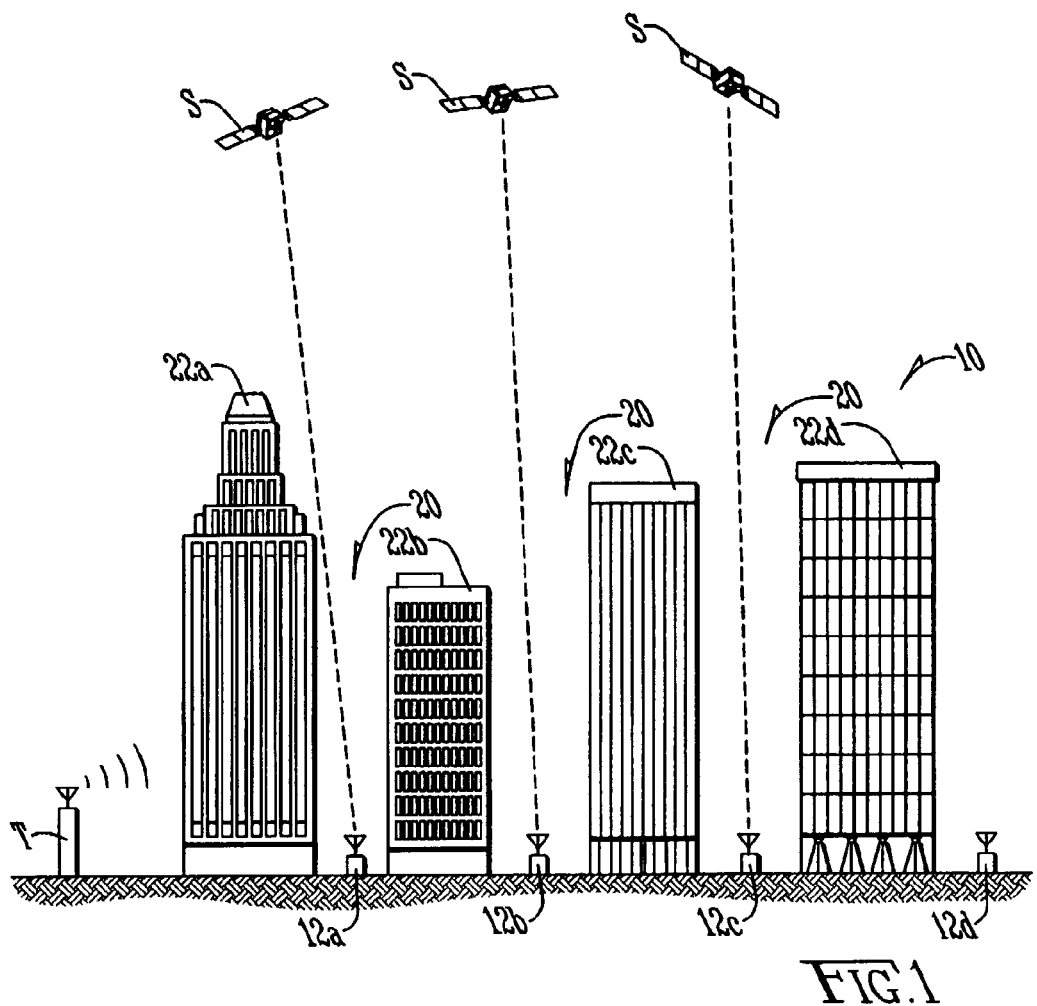
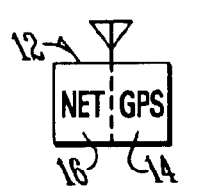
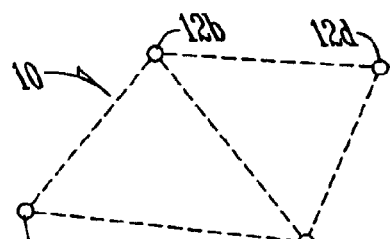

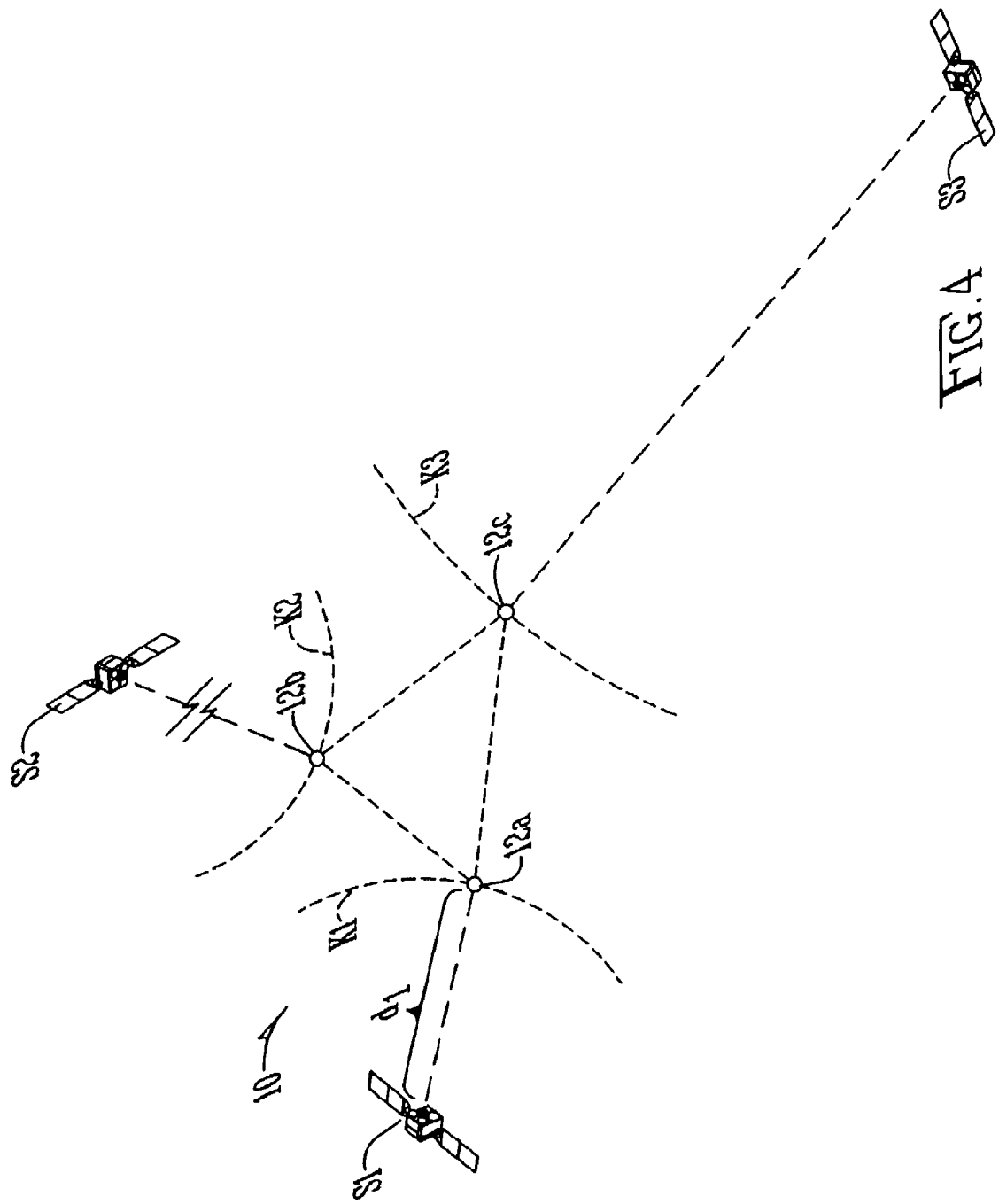

DISTRIBUTED GPS FOR GEOLOCATION OF A NETWORK OF NODES

FIELD OF THE INVENTION

The invention relates to positioning systems, and more particularly, to the precise locating of nodes in a network.

BACKGROUND OF THE INVENTION

Dense urban terrain represents the single most hazardous environment for US military forces. Key to stealthy operation in this environment is to be able to maintain communication and situational awareness among cooperating forces. Some communication systems are very effective when operating in such environments and may even be adapted to perform ranging, i.e., distance measurement. On the other hand, GPS navigation is not always available because signal reception to a sufficient number of satellites may be restricted by limited visibility. GPS signal reception is also vulnerable to jamming, and anti-jamming measures are needed to improve the robustness when operating in such conditions.

Emerging Time-Difference-Of-Arrival (TDOA) technologies offer the promise of low cost, low power communication over short to moderate distances. TDOA technologies, which are also called Time-Of-Arrival (TOA) technologies, have characteristics that naturally support high precision ranging and time synchronization measurements between communicating terminals. Such measurements, however, provide only relative positions due to constant movement and variation in circumstances of nodes in a network. Relevant TDOA technologies cannot, by themselves, determine the absolute location and orientation of the cooperating nodes or units in the network.

It is therefore an object of the invention to provide absolute location information for nodes in a network.

It is yet another object to provide absolute location information for some or all nodes in a network when not enough nodes in the network are able or capable of obtaining a sufficient number of signals from GPS signal sources to derive a unique position for the nodes.

A feature of the invention is the synergistic combination of TDOA technologies with GPS technologies to arrive at a precise location for each node in the network.

An advantage of the invention is that otherwise incomplete GPS information received by a node in a network can be used to provide a precise location for all nodes in the network.

SUMMARY OF THE INVENTION

The invention provides a method of determining absolute positions of devices in a network. According to the method, relative distances between the devices are determined. For each of at least one of the devices, a range is calculated from a number of distant ranging sources that is less than an amount required to obtain a precise location of the device. The calculated ranges are combined with the determined relative distances to determine a unique absolute position of the devices in the network.

The invention also provides a method of determining absolute positions of a plurality of nodes in a network, the plurality of nodes including first, second and third nodes. According to the method, relative distances are determined between the first, second, and third nodes. A first range is calculated from a first distant ranging source to the first node. A second range is calculated from a second distant ranging source to the second node. A third range is calculated from a third distant ranging source to the third node. An absolute location of the first node is determined using a combination of (a) the first range, the second range, and the third range, and (b) the relative distances between the first, second, and third nodes.

The invention further provides a mobile network including a plurality of independently moveable nodes, each of the nodes having a transmitter for transmitting range information to other nodes in the network. Each of the nodes also has a receiving apparatus for receiving range information from other nodes in the network and from at least one distant ranging source. A location of a node relative to other nodes is determined from the range information from other nodes in the network. An absolute location of at least one node in the network is determined from range information from at least one distant ranging source and from the range information from the other nodes.

BRIEF DESCRIPTION OF THE DRAWINGS

FIG. 1 is a schematic drawing of a network of nodes in an urban setting.

FIG. 2 is a schematic drawing of a geolocation device according to the invention.

FIG. 3 is a schematic drawing of a network of nodes showing relative positions between nodes according to the invention.

FIG. 4 is a schematic drawing of part of the network shown in FIG. 3 with respect to distant ranging sources.

DETAILED DESCRIPTION OF THE DRAWINGS

Figure 5:
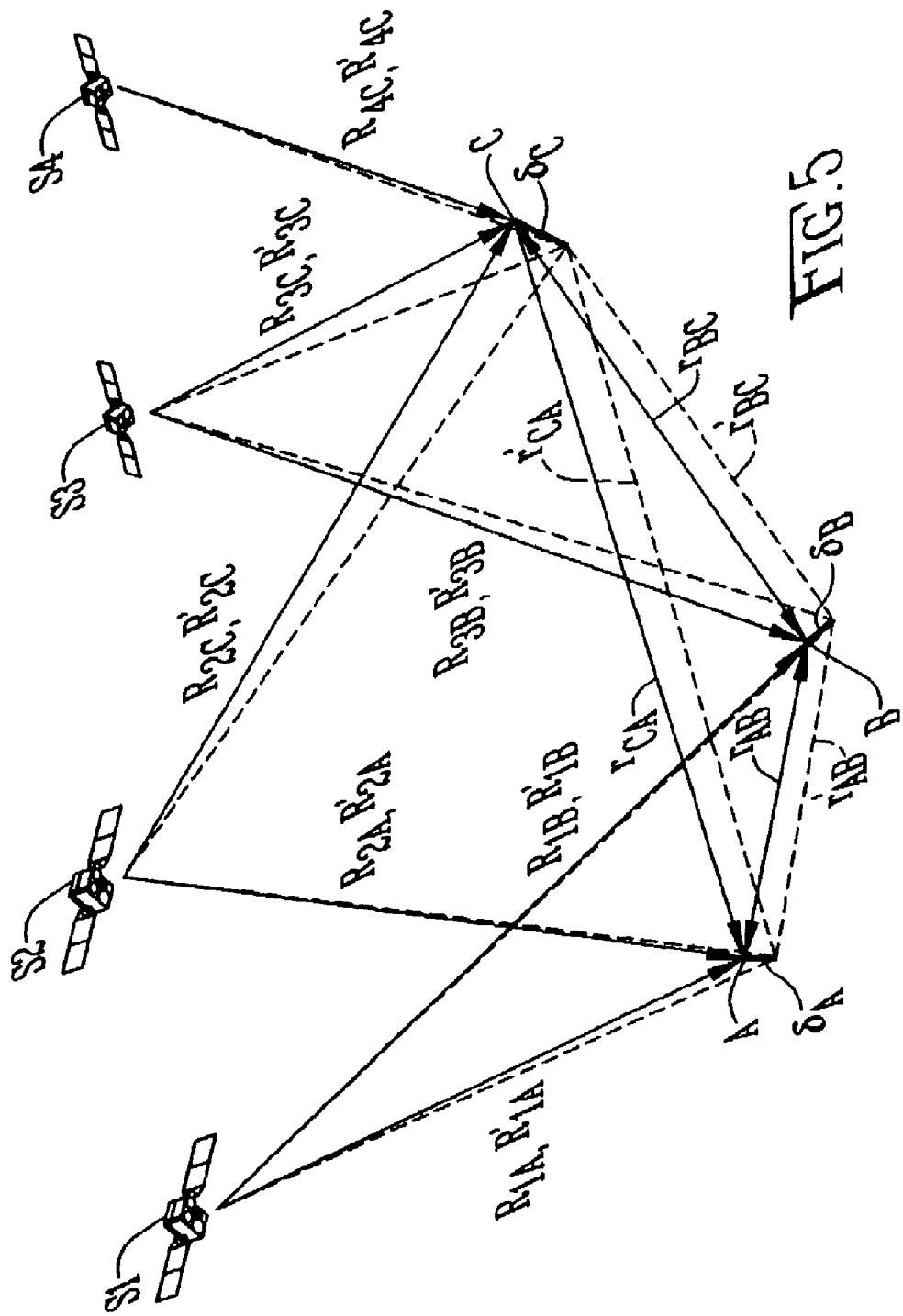
FIG. 5 is a schematic drawing of a network of nodes according to another embodiment of the invention.

A network according to the present invention is generally depicted in FIG. 1 at reference number 10. Network 10 includes a plurality of independently moveable nodes or devices 12a–d (and indicated generally by reference number 12) which are useable by soldiers or security personnel. As shown schematically in FIG. 2, each device 12 typically includes a receiver 14 that receives time-coded signals from distant ranging sources, such as GPS satellites S or earth-bound transmitters T, and uses the signals to compute the precise location of the device.

Device 12 also includes a transceiver 16 that sends and receives signals to and from other devices in network 10. In a preferred embodiment, transceiver uses Time Difference of Arrival (TDOA) or Time of Arrival (TOA) technology to determine the relative ranges, or distances, of each device 12a–d. Specifically, a time-coded message, unique to each device, is transmitted from a first device 12a–d to a second device. Upon reception, the second device then resends the signal back to the first device. At the same time, the second device also measures the observed time delay in the signal from the first device, which represents the physical relative range between the devices and the difference in the timing between the devices. The second device sends this information back to the first device as digitally encoded data. When the first device receives the return signal, the first device's measurement of the observed time delay from when the signal was first transmitted represents the round trip delay the signal took in traveling between the two devices. When halved, this measurement represents the time delay due to the relative range between the devices. When this estimate of relative range is subtracted from the digital data received from the second device, the result is an estimate of the relative difference in the timing of the two devices. The relative ranges are sent to a processor, which may be located at a centralized location or integral within one or more of devices 12a–d. The processor analyzes the relative ranges and may determine, using known geometric methods, the relative position of the nodes with respect to each other, as shown by example in FIG. 3.

As previously stated, each receiver 14, which is an integral part of device 12, receives signals from distant ranging sources S, T to compute the precise location of the receiver. However, in the two-dimensional example shown in FIG. 3, signals from at least three distant ranging sources are required to provide a precise location of a receiver. If fewer than three signals are actually received by a single receiver, which may be the case in urban or jungle warfare situations, it is not possible to derive precise location information for that receiver. Devices 12a–d in FIG. 1, for example, are deployed in an urban area where the "canyons" 20 created by high-rise buildings 22a–d permit reception of only one distant ranging source S, T by each device 12a–d.

The present invention provides precise location information for a GPS-enabled device in situations where an otherwise insufficient number of signals from distant ranging sources are obtainable. Incomplete GPS-derived location information from a minimum number of devices in a network may be combined with the previously-derived relative ranges of the devices to provide a precise location for the nodes in the network.

FIG. 4 depicts a portion of communications network 10 after the relative ranges of each of devices 12a–c have been determined. Device 12a receives a signal from a GPS satellite S1, device 12b receives a signal from a GPS satellite S2, and device 12c receives a signal from a GPS satellite S3. The signals are used to determine the distance, or range, of each device 12a–c from the respective satellite S1, S2, S3 from which it has received a signal. Device 12a is shown as being a distance d1 from satellite S1, but its position can be anywhere along range arc K1. Likewise, devices 12b and 12c could be placed anywhere along range arcs K2, K3, respectively. However, since the relative distance between the devices is known, the precise location of devices 12a–c along range arcs K1, K2, K3, respectively, can be derived. This is because the relative position of the three devices produces a unique topology with respect to the three satellites, and therefore the unique absolute position coordinates of the devices can be computed.

The previous embodiment assumes that receiver timing is perfectly synchronized to satellite timing. In situations where pseudorange measurements are obtained from the distant ranging sources, i.e., where there is an assumed time bias error, timing issues as well as the geometric constraints described above must also be considered when calculating the position coordinates of the devices. The GPS pseudorange time bias will be different for measurements that come from different GPS receivers. In the worst case where all measurements come from different GPS receivers, there are as many time bias unknowns as measurements. There are therefore twice as many unknowns as measurements, and no location solution can be calculated. However, with the TDOA ranging approach discussed previously, it is possible to transfer timing biases that occur between the devices into a single device. This allows all GPS measurements from different GPS receivers to be reduced to having the same time bias, allowing computation of a precise GPS solution.

The invention has been described in the context of solving a two-dimensional solution for a network. FIG. 5 illustrates a three-dimensional solution for a network consisting of three devices or nodes A, B and C. The nodes receive signals from satellites S1, S2, S3, and S4. Vectors representing the relative positions and ranges of the nodes and satellites at actual node locations are represented as solid lines. Vectors representing the relative positions and ranges of the nodes and satellites at assumed, approximate or nominal node locations are represented as dashed lines. The assumed incremental position change of each node is shown by the perturbations or segments $\delta_A$, $\delta_B$, and $\delta_C$, respectively. The actual node locations can be derived if perturbations $\delta_A$, $\delta_B$, and $\delta_C$ are solved for. If linearizing the 10-tuple vector measurement equation involved, one way to solve for the linearized equation is by weighted least squares, with a weighting matrix of W as is known in the art. A linearized equation of the following form may be used to solve for the perturbations:

$$\underbrace{\begin{bmatrix} r_{AB} - r'_{AB} \\ r_{BC} - R'_{BC} \\ r_{CA} - r'_{CA} \\ R_{1A} - R'_{1A} \\ R_{1B} - R'_{1B} \\ R_{2A} - R'_{2A} \\ R_{2C} - R'_{2C} \\ R_{3B} - R'_{3B} \\ R_{3C} - R'_{3C} \\ R_{4C} - R'_{4C} \end{bmatrix}}_{z} = \underbrace{\begin{bmatrix} h_{AB} & -h_{AB} & 0 & 0 \\ 0 & h_{BC} & -h_{BC} & 0 \\ -h_{CA} & 0 & h_{CA} & 0 \\ h_{1A} & 0 & 0 & 1 \\ 0 & h_{1B} & 0 & 1 \\ h_{2A} & 0 & 0 & 1 \\ 0 & 0 & h_{2C} & 1 \\ 0 & h_{3B} & 0 & 1 \\ 0 & 0 & h_{3C} & 1 \\ 0 & 0 & h_{4C} & 1 \end{bmatrix}}_{H} \underbrace{\begin{bmatrix} \delta_A \\ \delta_B \\ \delta_C \\ \Delta t \end{bmatrix}}_{\delta} \Rightarrow \delta = (H^T W H)^{-1} H^T W z \quad \text{(Equation 1)}$$

In this case, each perturbation $\delta_A$, $\delta_B$, and $\delta_C$ is a 3-tuple column vector representing the three-dimensional difference between the assumed node location and the actual node location. Each component of h in the matrix H is a 1×3 row subvector of direction cosines. $\Delta t$ is a clock phase error associated with the GPS pseudorange measurements and represents the single time bias as has been previously discussed. The components of the z vector are range measurements between nodes A, B, C, and satellites S1, S2, S3, and S4 as identified in FIG. 5. For example, $R_{1A}$ represents a range measurement between satellite S1 and node A at an actual node location, while $R'_{1A}$ represents a range measurement between satellite S1 and node A at an assumed node location.

In this 3-D example, there are a total of ten unknown variables to be solved (three dimensional components for each of the three nodes, plus one clock error). The ten independent measurements available to solve for this least squares equation include three relative ranges between the three nodes, plus seven pseudorange measurements from four GPS satellites. Numerous other combinations to obtain valid solutions are possible, each yielding varying degrees of solution quality.

Figure 6:
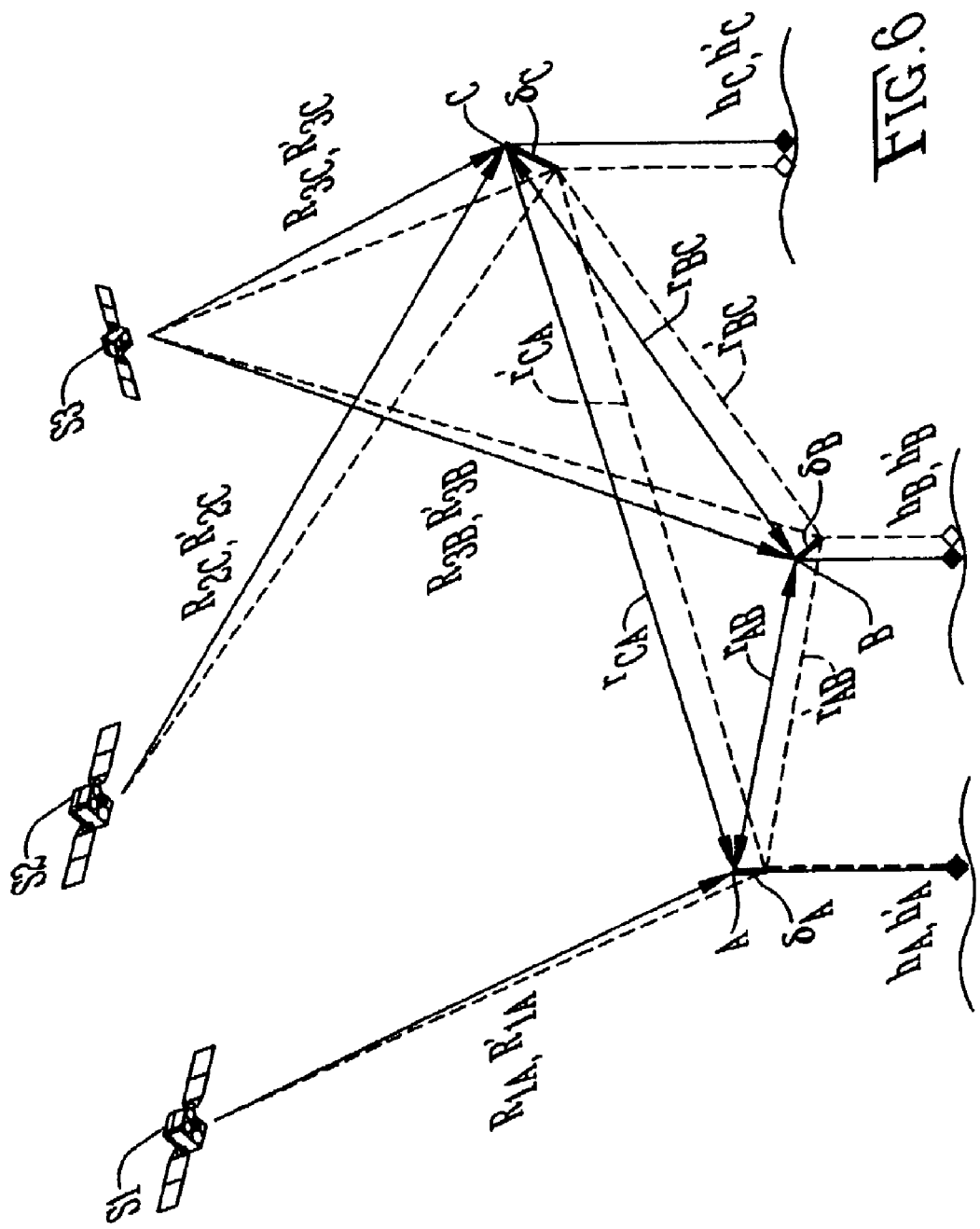
FIG. 6 is a schematic drawing of a network of nodes according to still another embodiment of the invention.

If available, barometric or pressure altitude used at each node for relative height between nodes also constitutes independent measurements that may be used in place of some GPS pseudorange measurements. This should be evident to those skilled in the art. An example illustrating the use of altitude measurements (h) to solve for perturbations $\delta_A$, $\delta_B$, and $\delta_C$ is shown in FIG. 6. In the following linearized equation that may be used to solve for the perturbations and the new positions of the nodes, $h_A$, $h_B$ and $h_C$ represent altitudes at actual locations of nodes A, B and C, respectively, and $h'_A$, $h'_B$ and $h'_C$ represent altitudes of the nodes, respectively, at assumed locations.

$$\underbrace{\begin{bmatrix} r_{AB} - r'_{AB} \\ r_{BC} - r'_{BC} \\ r_{CA} - r'_{CA} \\ R_{1A} - R'_{1A} \\ R_{2C} - R'_{2C} \\ R_{3B} - R'_{3B} \\ R_{3C} - R'_{3C} \\ h_A - h'_A \\ h_B - h'_B \\ h_C - h'_C \end{bmatrix}}_{z} = \underbrace{\begin{bmatrix} h_{AB} & -h_{AB} & 0 & 0 \\ 0 & h_{BC} & -h_{BC} & 0 \\ -h_{CA} & 0 & h_{CA} & 0 \\ h_{1A} & 0 & 0 & 1 \\ 0 & 0 & h_{2C} & 1 \\ 0 & h_{3B} & 0 & 1 \\ 0 & 0 & h_{3C} & 1 \\ [0\ 0\ 1] & 0 & 0 & 0 \\ 0 & [0\ 0\ 1] & 0 & 0 \\ 0 & 0 & [0\ 0\ 1] & 0 \end{bmatrix}}_{H} \underbrace{\begin{bmatrix} \delta_A \\ \delta_B \\ \delta_C \\ \Delta t \end{bmatrix}}_{\delta} \Rightarrow \delta = (H^T W H)^{-1} H^T W z \quad \text{(Equation 2)}$$

A linear weighted least squares solution is used here for illustrative purposes. Other linear methods, which employ a Kalman filter, or nonlinear (or direct) methods may also be used in its place. The benefits and liabilities of all these methods are well understood and require no different considerations than when dealing with the solution of any standard navigation problem.

Depending on the operational conditions encountered, this Distributed GPS concept allows for full navigation operation even when there is restricted access to GPS signals at any one node. However, such situations can be dynamic. There may be brief encounters when this restricted access worsens to the point that even the minimum conditions required for Distributed GPS cannot be met, thereby causing a "navigation outage". To deal with such contingencies, the nodes may be equipped with inertial sensors to coast through such outages.

An advantage of the invention is that it is not necessary for every node in a network to achieve a precise position fix by itself. By comparing relative inter-node positions with otherwise incomplete GPS data, a precise position fix can be determined for all nodes in the network.

Another advantage is that precise positions may be determined for network nodes located in urban or other environments that hinder location signals from distant ranging sources such as GPS satellites.

While the invention has been disclosed in its preferred form, the specific embodiments thereof as disclosed and illustrated herein are not to be considered in a limiting sense as numerous variations are possible. The subject matter of the invention includes all novel and non-obvious combinations and subcombinations of the various elements, features, functions and/or properties disclosed herein. No single feature, function, element or property of the disclosed embodiments is essential to all of the disclosed inventions. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the invention of the present disclosure.

What is claimed is:

1. A method of determining absolute positions of a plurality of nodes in a network, the plurality of nodes including first, second and third nodes, the method comprising:
   determining relative distances between the first, second, and third nodes;
   calculating a first range from a first distant ranging source to the first node;
   calculating a second range from a second distant ranging source to the second node;
   calculating a third range from a third distant ranging source to the third node;
   determining an absolute location of the first node using a combination of
      the first range, the second range, and the third range, and
      the relative distances between the first, second, and third nodes,
   wherein the step of determining relative distances comprises:

transmitting, from the first node, a first signal that is unique to the first node;

receiving the first signal at the second and third nodes;

retransmitting the first signal from the second and third nodes;

transmitting, from the second and third nodes to the first node, a second signal that represents an observed time necessary for the first signal to be transmitted from the first node to the second and third nodes;

receiving the retransmitted first signal and the second signal at the first node;

calculating distances between the first node and the second and third nodes, respectively, using one-half of a time necessary for the first signal to be transmitted from and retransmitted to the first node; and calculating time biases between the first node and the second and third nodes, respectively, by subtracting, from the observed time, one-half of the time necessary for the first signal to be transmitted from and retransmitted to the first node.

2. The method of claim 1, wherein the step of calculating distances is performed at a processing location that is separate from any of the plurality of nodes.

3. The method of claim 1, wherein the step of calculating the first range includes receiving a first transmission from the first distant ranging source and deriving the first range from a time required for the first transmission to travel from the first distant ranging source to the first node.

4. The method of claim 3, wherein the steps of calculating the second and third ranges include:

receiving a second transmission from the second distant ranging source and deriving the second range from a time required for the second transmission to travel from the second distant ranging source to the second node; and receiving a third transmission from the third distant ranging source and deriving the third range from a time required for the third transmission to travel from the third distant ranging source to the third node.

5. The method of claim 1, further including determining an absolute location of the second and third nodes using a combination of the first range, the second range, and the third range, and the relative distances between the first, second, and third nodes.

6. The method of claim 1, wherein the step of determining relative distances further includes determining relative positions of the first, second and third nodes.

7. The method of claim 1, further including:

calculating a fourth range between one of the first, second, and third distant ranging sources and one of the first, second, and third nodes;

determining an altitude range of at least one of the first, second, and third nodes; and determining an absolute position of the first, second, and third nodes using a combination of the first, second, third, and fourth ranges, the relative distances between the first, second, and third nodes, and the position component of at least one of the first, second, and third nodes.

8. The method of claim 1, further including determining relative timing between the first, second and third nodes.

9. The method of claim 1, wherein at least one of the steps of calculating the first, second and third ranges includes:

receiving a pseudorange signal from at least one of the first, second, and third distant ranging sources; and compensating for clock error.

10. The method of claim 9, wherein compensating for clock error includes receiving a signal from a fourth distant ranging source.

11. The method of claim 1, wherein at least one of the first, second, and third ranges is a pseudorange, and wherein at least one of the first, second and third nodes receives a fourth signal from a fourth distant ranging source.

12. A method of determining absolute positions of a plurality of nodes In a network, the plurality of nodes including first, second and third nodes, the method comprising:

determining relative distances between the first, second, and third nodes;

calculating a first range from a first distant ranging source to the first node;

calculating a second range from a second distant ranging source to the second node;

calculating a third range from a third distant ranging source to the third node;

determining an absolute location of the first node using a combination of the first range, the second range, and the third range, and the relative distances between the first, second, and third nodes;

calculating a fourth range between one of the first, second, and third distant ranging sources and one of the first, second and third nodes;

calculating a fifth range between one of the first, second, and third distant ranging sources and one of the first, second and third nodes;

calculating a sixth range between one of the first, second and third distant ranging sources and one of the first, second, and third nodes;

calculating a seventh range between a fourth distant ranging source and one of the first, second, and third nodes; and determining an absolute location, in three dimensions, of the first, second, and third nodes using a combination of the first, second, third, fourth, fifth, sixth, and seventh ranges, and the relative distances between the first, second, and third nodes.

13. The method of claim 12, wherein the step of calculating the first range includes receiving a first transmission from the first distant ranging source and deriving the first range from a time required for the first transmission to travel from the first distant ranging source to the first node.

14. The method of claim 13, wherein the steps of calculating the second and third ranges include:

receiving a second transmission from the second distant ranging source and deriving the second range from a time required for the second transmission to travel from the second distant ranging source to the second node; and receiving a third transmission from the third distant ranging source and deriving the third range from a time required for the third transmission to travel from the third distant ranging source to the third node.

15. The method of claim 12, further including determining an absolute location of the second and third nodes using a combination of the first range, the second range, and the third range, and the relative distances between the first, second, and third nodes.

16. The method of claim 12, wherein the step of determining relative distances further includes determining relative positions of the first, second and third nodes.

17. The method of claim 12, wherein the step of determining an absolute location comprises:
comparing the first, second, third, fourth, fifth, sixth, and seventh ranges with respective similarly defined range measurements obtained for a assumed position solution for the network; and
using results from the comparing step to calculate position differences, from the assumed position solution, for the first, second, and third nodes.

18. The method of claim 12, wherein at least one of the steps of calculating the first, second and third ranges includes:
receiving a pseudorange signal from at least one of the first, second, and third distant ranging sources; and
compensating for clock error.

19. The method of claim 18, wherein compensating for clock error includes receiving a signal from a fourth distant ranging source.

20. The method of claim 12, wherein at least one of the first, second, and third ranges is a pseudorange, and wherein at least one of the first, second and third nodes receives a fourth signal from a fourth distant ranging source.

* * * * *